J. SQUAIR.
KNIFE BLADE OF REAPING, MOWING, AND LIKE MACHINES.
APPLICATION FILED JULY 20, 1908.

922,058.  Patented May 18, 1909.

WITNESSES.
Chas. K. Davis
E. L. Corbett.

INVENTOR
James Squair
by Brock Beeken & Smith
ATTORNEYS

UNITED STATES PATENT OFFICE.

JAMES SQUAIR, OF BULAWAYO, RHODESIA.

KNIFE-BLADE OF REAPING, MOWING, AND LIKE MACHINES.

No. 922,058.　　　　Specification of Letters Patent.　　　Patented May 18, 1909.

Application filed July 20, 1908. Serial No. 444,563.

*To all whom it may concern:*

Be it known that I, JAMES SQUAIR, a subject of the King of Great Britain and Ireland, and residing at Bulawayo, Southern Rhodesia, have invented certain new and useful Improvements in and Connected with the Knife-Blades of Reaping, Mowing, and Like Machines, of which the following is a specification.

This invention relates to the knife blades of reaping, mowing and like machines and particularly to blades having serrations on their under sides adjacent to the cutting edges. These blades as at present formed require re-sharpening every few days and have to be removed from the machine for that purpose.

The object of the present invention is to obviate the necessity for re-sharpening, that is to say to render the blades self-sharpening in use so that they will retain a keen edge until practically worn out.

The invention consists in deepening the grooves or serrations on the under face adjacent to the cutting edges, as they recede from the edge.

Figure 1:
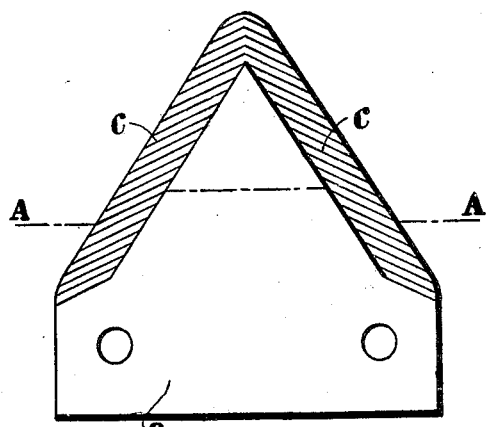
Figure 2:
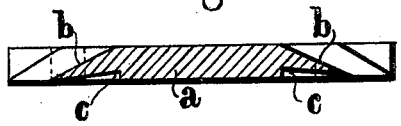

The accompanying drawings illustrate by way of example a knife blade of a mowing machine formed according to the invention. Figure 1 being a view of the under face of the blade, and Fig. 2 an irregular section on A—A Fig. 1, the section passing longitudinally through the grooves.

In carrying out the invention according to one mode as in the application to the blade, $a$, of an ordinary mowing machine the blade is made of the usual triangular form with the upper faces, $b$, of the cutting edge beveled. The under face of the blade is flat as usual except near the cutting edges where a number of grooves, $c$, serrations or the like are formed the grooves preferably deepening as they recede from the edges. The grooves preferably incline toward the center line of the blade as indicated in Fig. 1. The effect is to give a "sickle" edge to the blade, and blades so formed may retain keen edges and remain in use, without necessitating re-sharpening, until practically worn out.

The invention is not confined to any particular form of groove or serration or to any special method of forming the same, the grooves being formed by stamping, cutting or otherwise as found most convenient.

Having thus described my invention what I claim is new and desire to secure by Letters Patent is:—

1. A knife-blade of the type referred to having grooves in the under face adjacent to the cutting edges said grooves deepening as they recede from the edges.

2. A knife blade of the type referred to, having grooves in the under face adjacent to the cutting edges said grooves being inclined toward the center line of the blade and deepening as they recede from the edges.

In testimony whereof I have signed my name to this specification in the presence of two subscribing witnesses.

JAMES SQUAIR.

Witnesses:
　ROBERT JACKSON,
　JOHN SHWAITS.